April 30, 1957 L. P. ELBINGER 2,790,942
DIELECTRIC CIRCUIT TRANSDUCER APPARATUS
Filed Nov. 19, 1953 2 Sheets-Sheet 1

INVENTOR
LEWIS P. ELBINGER
BY
Eugene S. Lovett
ATTORNEY

April 30, 1957     L. P. ELBINGER     2,790,942
DIELECTRIC CIRCUIT TRANSDUCER APPARATUS
Filed Nov. 19, 1953     2 Sheets-Sheet 2
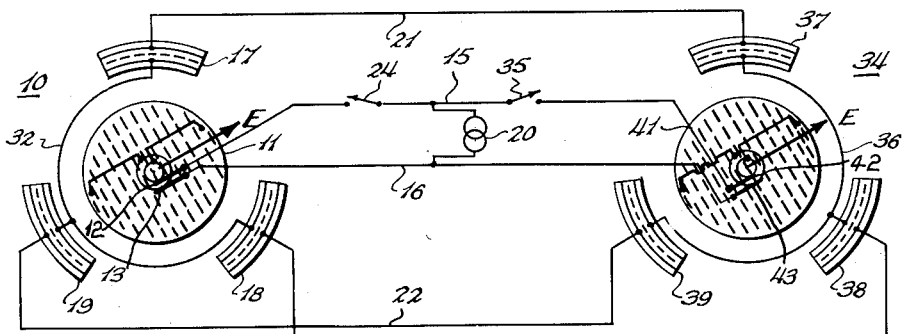
*Fig. 5.*
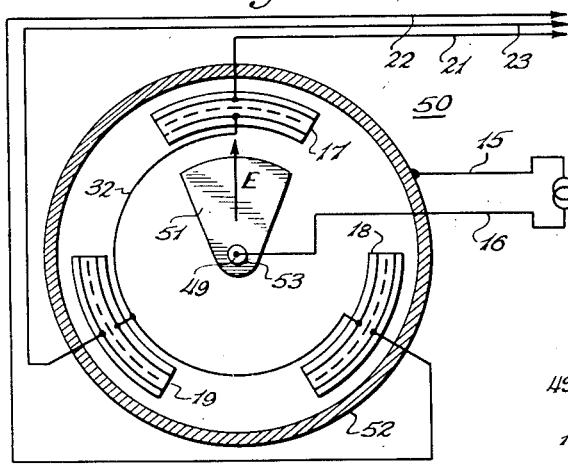
*Fig. 6.*
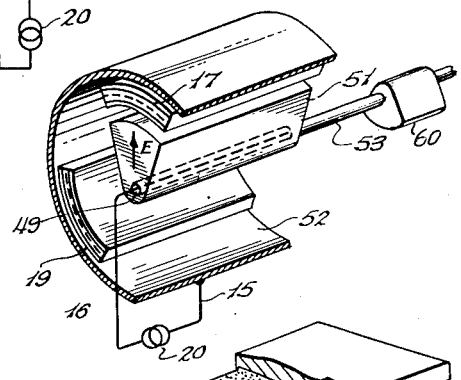
*Fig. 7.*
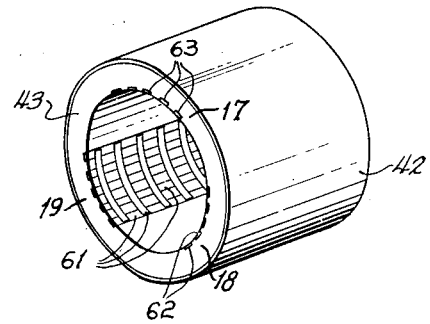
*Fig. 8.*
*Fig. 9*
INVENTOR
LEWIS P. ELBINGER
BY
*Eugene S. Lovette*
ATTORNEY

United States Patent Office 2,790,942
Patented Apr. 30, 1957

2,790,942

DIELECTRIC CIRCUIT TRANSDUCER APPARATUS

Lewis P. Elbinger, Great Neck, N. Y.

Application November 19, 1953, Serial No. 393,151

21 Claims. (Cl. 318—23)

My invention relates to data-transmission system apparatus, and more particularly, to dielectric electro-mechanical transducers.

In radar and fire control equipment, an angular displacement imparted to one shaft often must be reproduced at a second shaft. Very often the two shafts can not be mechanically linked because of the distance between them. Consequently, it is common to use an electro-mechanical transducer system, i. e. a synchro system, to transmit electrically the angular data from one synchro to another synchro.

The synchro system consists of two synchro devices. One is known as the transmitter which converts the angular displacement into an equivalent electrical signal. The other device is known as the repeater. The repeater is electrically coupled to the transmitter. The signal received by the repeater from the transmitter is reconverted into mechanical displacement. The transmitter and repeater are substantially identical in structure; except, the latter usually incorporates a mechanical damper.

The synchro device of prior art design is essentially a small, two-pole rotor, alternating current machine. The transmitter rotor, to which angular data is imparted, consists of a single coil of wire wound about an iron core. The core is made up of thin sheets or laminations. The ends of the coil are connected to slip rings which engage brushes. The transmitter is energized by an alternating current source connected to the brushes. The transmitter stator, fixed in position, is made up of iron sheets or laminations. Uniformly spaced slots are provided in the stator through which are wound three separate coils spaced mechanically 120° apart. These coils may be connected either in delta or Y relationship. The stator coils of both transmitter and repeater each define a single phase system.

In the transmitter, voltages are induced in the stator coils by transformer coupling with the energized rotor coil. The stator voltages are either in phase or out of phase with respect to the voltage of the rotor. The phase relationship and the magnitude of the stator voltages are determined by the angular displacement or position of the rotor with respect to the stator coils. The voltages developed across the coils of the transmitter stator are connected to corresponding coils of the repeater stator. With the repeater rotor energized by the same source supplying the rotor of the transmitter, the rotor of the repeater is caused to turn in correspondence with the angular displacement of the transmitter.

My invention contemplates transducer devices in which the rotor and stator of the synchro units are made of dielectric material. In the embodiments described hereinafter, one arrangement requires that the rotor and stator be made of dielectric material that is substantially anisotropic. In using the term anisotropic, I contemplate parallel layers of relatively conducting material embedded in a body of relatively non-conducting dielectric material. The layers of conducting material are spaced apart in the dielectric to support an electric field therethrough in the direction perpendicular to the plane of the conducting layers. On the other hand, another arrangement is disclosed in which the dielectric rotor and the stator poles need not be anisotropic.

Synchro transmitters, repeaters or control transformers in which the principles of my invention are incorporated, do not have rotor or stator coil windings. The magnetic coupled, transformer mode-of-operation of the prior art devices is replaced by preferable dielectric-coupled circuits. The advantages realized by dielectric-coupled circuits are as follows. The dielectric transducer is mechanically less complex; it can be made smaller in size and lighter in weight than the equivalent magnetic coil wound transducer. This is a notable advantage especially in those industries where space and weight are primary factors in the design of equipment. Aircraft apparatus is one example of such equipment. Moreover, the instant invention affords ease and economy in the manufacture of transducers because the dielectric transducer does not require coil windings. In addition, dielectric material is substantially cheaper than permeable magnetic material. One adaptation of my invention eliminates slip rings and brushes and thus offers a further measure of economy and mechanical simplicity. A further advantage of my invention is that the electrical and mechanical inertia of the transducer are decreased to produce faster signal response. Furthermore, the dielectric transducer may be energized either by a direct current source or an alternating current source. On the other hand, the prior art transformer-coupled transducer requires alternating current sources. Thus my invention adds a degree of flexibility not available with the prior art devices.

It is therefore an object of the instant invention to provide a synchro transducer in which the stator poles and rotor thereof are made of dielectric material substantially anisotropic.

It is a further object of my invention to provide a synchro transducer of lighter weight and smaller size than the equivalent transducer of the magnetic coupled type.

It is a further object of my invention to provide a synchro transducer which may be energized either by a direct current source or an alternating current source.

It is a further object of my invention to provide a synchro transducer that does not use stator or rotor coils.

It is a further object of my invention to provide a dielectric transducer which is mechanically simple and affords ease and economy in the manufacture thereof.

It is a further object of my invention to provide a dielectric transducer which is capable of comparatively quick signal response.

It is a further object of my invention to provide a dielectric transducer design which eliminates brushes and slip rings in the rotor circuit.

Further objects and advantages of the present invention will become apparent from the described embodiments and drawings in which corresponding parts are designated by like reference numbers.

Fig. 5 is a schematic wiring diagram of a synchro circuit employing the principles of my invention;

Fig. 6 is an end view of another embodiment of my invention employing a rotor design in which the dielectric rotor circuit need not be anisotropic and in which the slip rings and brushes are eliminated;

Fig. 7 is a view in perspective of the embodiment of Fig. 6;

Fig. 8 illustrates a printed circuit stator applicable to the synchros of the prior embodiments; and Fig. 9 illustrates another example of a substantially anisotropic dielectric body.

Figure 1:
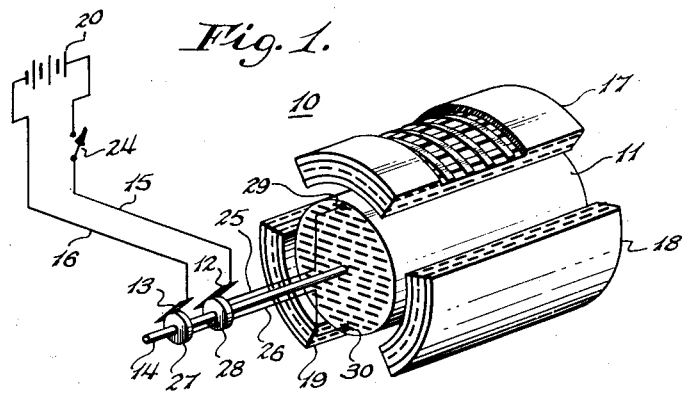
Fig. 1 is a view in perspective of a preferred embodiment of a transducer synchro transmitter in which the stator poles and rotor consist of dielectric substantially anisotropic.

A synchro transmitter 10 incorporating the principles of my invention is shown in Fig. 1. Synchro transmitter 10 has a rotor 11, a pair of brushes 12 and 13, a shaft 14, a pair of slip rings 27, 28, three stator poles 17, 18 and 19 and a switch 24. A battery 20 energizes rotor 11. A source of alternating voltage, such as, 115 volts 60 cycles or 115 volts 400 to 800 cycles, may be used equally as well in lieu of battery 20.

Rotor 11 consists of a cylindrical-shaped body of anisotropic dielectric material. For the purpose of the instant invention, anisotropic dielectric material is made of alternate layers of relatively non-conducting and relatively conducting materials. Phenol-formaldehyde (Bakelite), mica, polystyrene or the equivalent are suggested as examples of non-conducting dielectric material. A thin layer of parallel and spaced apart strips of silver inserted between adjacent slabs of dielectric material or strips of silver painted on the surfaces of the slabs of dielectric material are examples of conducting layers, note Fig. 3. The conducting layer is gridiron-shaped, meshed or perforated to allow an electrostatic field to extend through the anisotropic body perpendicular to the layer of conducting material. Further examples of anisotropic dielectric bodies consist of grids or mesh-shaped layers of conducting material embedded in dielectric material; a bonded mixture of dielectric material with particles of conducting material such as silver or carbon interspersed in discrete layers between layers of pure dielectric material, as shown in Fig. 9; or sheets of dielectric with low conductivity paint spread over the surfaces of the sheets.

Figure 2:
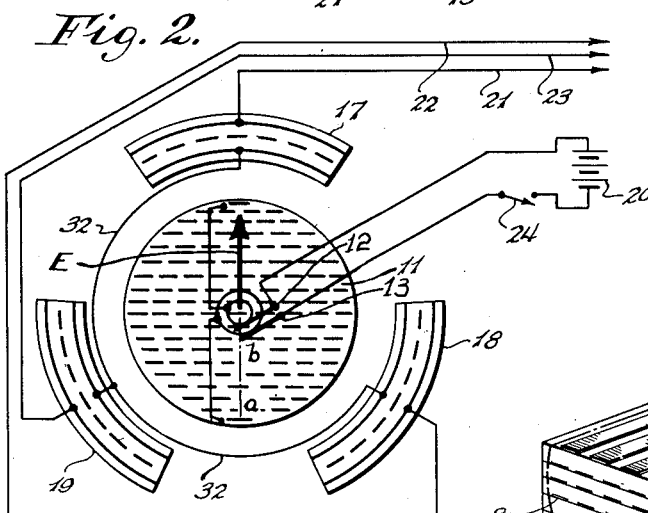
Fig. 2 is an end view of the device of Fig. 1.

The dashed lines along rotor 11 and stator poles 17, 18 and 19 of Figs. 1 and 2 represent the ends of the conducting elements making up the conducting layers. Source 20 is connected to the outer and diametrically opposite conducting layers 29, 30 embedded in the dielectric body of rotor 11 in the following manner; switch 24 is between one terminal of battery 20 and the forward end of lead wire 15. The other end of lead wire 15 is connected to brush 12. Brush 12 engages slip ring 28. A rotor lead 25 connects ring 28 and layer 29. The return circuit at one end starts at layer 30 and traverses a lead 26 to ring 27 to brush 13 to a lead 16 to the other terminal of source 20. It is preferable that leads 25, 26 be permanently connected to respective layers 29, 30 such as by soldering or welding the leads to the correlated layers; otherwise leads 25, 26 might work themselves loose and thereby disconnect from the rotor. The electric field established by source 20 extends outwardly from the rotor through the region between rotor and stator and into the stator poles. However, the field is guided by the aligned conducting surfaces and extends in a direction perpendicular to the conducting surfaces. This field at times is referred to as the fringing field.

Stationary, arcuate-shaped stator poles 17, 18 and 19, mutually spaced apart 120°, constitute the stator component of transmitter 10. Poles 17, 18 and 19 are made of anisotropic dielectric. Each outermost layer of relatively conducting material of the stator poles is connected to a respective end of output leads 21, 22 and 23, note Fig. 2. The other ends of leads 21, 22 and 23 are connected to a load such as a synchro repeater, note Fig. 5. The inner layers of relatively conducting material of each stator pole are connected together by leads 32 to complete a Y connected circuit. A delta connected circuit may be used equally as well. To accomplish a delta connection poles 17, 18 and 19 should be connected in series relationship with each other.

Figure 3:
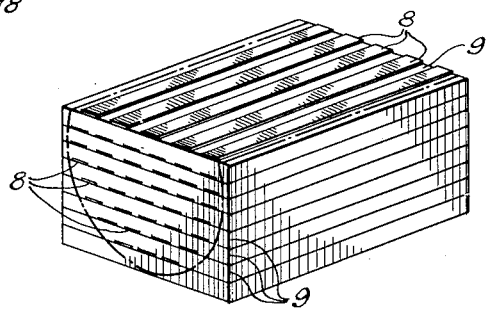
Fig. 3 is a sectional view in perspective of a block of dielectric material substantially anisotropic prior to machining same into the shape of the rotor for the synchro of Fig. 1.

One method of constructing rotor 11 is as follows, an anisotropic dielectric parallelepiped body is assembled by interleaving thin sheets of dielectric 9 and layers consisting of separate, spaced apart and parallel strips of silver 8. The conducting strips lie in a plane perpendicular to the plane of the paper and may be laid to extend crosswise, lengthwise as shown in Fig. 3 or in both directions. However, the conducting layers 29, 30 should consist of strips of silver extending in both directions, grid fashion. The parallelepiped is bonded, cemented or bound to make it an integral body. The cylindrical shape of rotor 11 is effected by cutting the parallelepiped into a cylinder by means of a lathe or any other conventional tool. An inner concentric hole, provided through rotor 11, receives shaft 14. It is preferable that shaft 14 be made of insulated material. The length of the synchro in the direction along the axis of rotation of its rotor is determined by the energy output desired. Slip rings 27, 28 are carried by shaft 14. Stator poles 17, 18 and 19 are made of the anisotropic dielectric material and may be of the same type forming rotor 11. To form the poles, an integral anisotropic body is assembled and subjected to heat and pressure to form the arcuate shape. The inner and outer conducting layers of the stator poles to which leads 21, 22, 23 and common leads 32 are connected consist of lengthwise and crosswise extending strips of silver, note sectional view of pole 17 in Fig. 1. The stator and therefore the entire synchro unit should be enclosed by a protective housing of any conventional design. The housing is not shown in the figures to afford a clear view of the components of the synchro.

Operation of the anisotropic dielectric transducer relies upon the fact that the tangential component of the electrostatic field at a conducting surface is zero while its normal component has a magnitude which may be expressed as follows:

$$E = \frac{D}{e} \quad (1)$$

where:

E is the normal component of the electric field;

D is the normal component of flux density in the anisotropic dielectric body; and $e$ is the normal component of dielectric constant of the anisotropic body.

The dashed lines along rotor 11 and poles 17, 18 and 19, note Fig. 2, indicate the ends of the embedded, parallel strips of conductors and the arrow E in Fig. 2 indicates the axis along which the electric field extends. Using the following definitions, the radial electric field and voltage for a particular pole may be determined.

Where:

$E_{Ri}$ is the radial component of the electric field at the center of stator pole;

$D_R$ is the radial component of flux density;

$e_R$ = radial dielectric constant of the poles;

$\theta$ = angular rotor position;

$\theta_i$ = angular pole position; and $i = 17, 18, 19$, the subscript $i$ designates the corresponding numbered stator pole.

The radial flux density for a stator pole may be expressed as follows:

$$D_{Ri} = (D_R) \cos(\theta - \theta_i) \quad (2)$$

Combining equations one and two, the radial electric field for the stator pole is:

$$E_{Ri} = \frac{(D_R)\cos(\theta - \theta_i)}{e_R} \quad (3)$$

The voltage supported by a particular pole from Equation 3 is:

$$V_i = K \cos(\theta - \theta_i), \text{ where } K \text{ is a constant} \quad (4)$$

Figure 4:
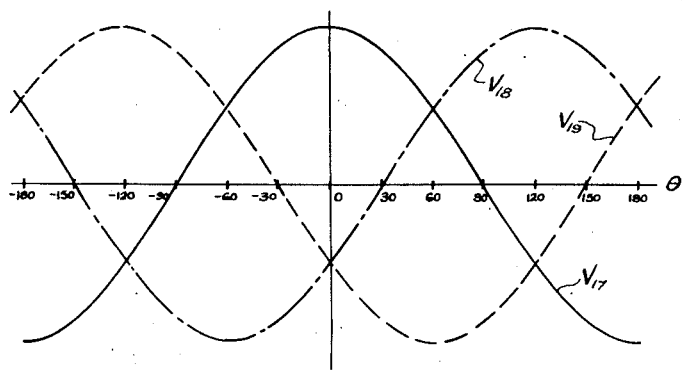
Fig. 4 is a plot of the stator voltages of the transmitter of Fig. 1.

Fig. 4 illustrates the stator voltages as a function of rotor angle $\theta$. The angular position of rotor 11 is measured from a standard position called positional zero. For the purpose of the instant explanation positional zero is along axis $a$—$b$, Fig. 2. Negative values of stator voltages, Fig. 4, indicate phase reversal with respect to source 20. The stator circuit does not constitute a three-phase set of voltages. The stator voltages are unequal in magnitude, but are either in phase or out of phase with each other and source 20.

The synchro transmitter and synchro repeater are similar machines except that the latter usually incorporates a mechanical damper. A damper is not shown in the figures because it is not part of the instant invention. Fig. 5 illustrates, schematically, a circuit of transmitter 10 coupled to a repeater 34. Rotor 11 of transmitter 10 and rotor 41 of repeater 34 are coupled by means of lead wires 15, 16 to the same source 20. In this instance switches 24 and 35 are closed. Source 20 may be alternating current or direct current. Stator poles 17, 18 and 19 of transmitter 10 are connected to corresponding stator poles 37, 38, 39 of repeater 34, by means of leads 21, 22 and 23. Stator poles of transmitter 10 are wired in Y connection. The common connection 32 completes the Y circuit. A similar arrangement is effected in the repeater stator by common connection 36. Upon imparting an angular displacement to rotor 11, the axis of the electric field vector E of rotor 11 is displaced correspondingly because of the effect of the anisotropic body forming rotor 11. This sets up in the stator poles 17, 18 and 19 correlated voltages. The stator voltages are applied to the stator poles of repeater 34 by leads 21, 22 and 23. Accordingly, a fringing electric field pattern is set up in repeater 34 corresponding to the voltages impressed across stator poles 37, 38 and 39. The fringing electric field couples through rotor 41. Rotor 41 will then align itself with this field in accordance with conventional electrostatic attraction. Consequently, repeater rotor 41 moves an angular distance equal to the displacement imparted to rotor 11.

From the description set forth hereinbefore, it is seen that my invention contemplates the use of dielectric circuits in place of the conventional magnetic-coupled transformer circuits of the prior art transducers. In addition to the embodiment disclosed hereinbefore, I also propose a dielectric circuit electromechanical transducer without any slip rings and pick-up brushes.

Referring now to Fig. 6, transmitter 50 has three stationary stator poles 17, 18 and 19, a rotor 51 mounted on a shaft 53 made of insulated material and a shell 52 made of conducting material surrounding the stator poles. The three stationary poles 17, 18, 19 are mutually spaced 120° apart. The poles are made preferably of anisotropic dielectric material. In all respects, these poles may be identical to the poles described hereinbefore. However, it should be understood that for the instant embodiment, stator poles of simple dielectric material, that is, not anisotropic also may be used. The dashed lines along poles 17, 18 and 19 indicate the ends of the strips of conducting material. Connections 32 complete the Y circuit of the stator poles. Shell 52 coextends axially with the stator. For convenience shell 52 may be cylindrically shaped.

Shaft 53 supports rotor 51. Rotor 51 is made of dielectric material; in the instant embodiment rotor 51 need not be anisotropic. Source 20, which may be either A. C. or D. C., serves to establish a fringing electric field through rotor 51 which couples to the juxtaposed stator pole. One terminal of source 20 is connected to conducting shell 52. The other terminal of source 20 extends into and along opening 49 within shaft 53. The terminal lead introduced into opening 49 may extend along in a free manner; it need not be tied or attached to shaft 53 or rotor 51. The potential between shell 52 and the lead within shaft 53 establishes a fringing field within the geometrically off-center rotor 51. The fringing field is controlled or guided by the shape of the rotor 51. It is desired that this field be asymmetric to the axis of shaft 53 and extend radially to correspond with vector E of Figs. 6 and 7. Accordingly, rotor 51 is shaped long and narrow in the plane perpendicular to the axis of shaft 53 and made geometrically off-center with respect to its axis of rotation. To effect this shape, rotor 51 may be a segment of a cylindrical prism, note Fig. 7. Since rotor 51 is geometrically off-center with respect to the axis of shaft 53, it may be desirable to counterbalance shaft 53 for smooth rotation, for example by a counterweight 60 attached to the lower side and end of shaft 53 external of the synchro, or by other known means such as an attached gear or load system connected to shaft 53 externally of the synchro. The electric field rotates with rotation of rotor 51. This allows the rotor to be made of an isotropic dielectric body, although a dielectric body substantially anisotropic will serve equally as well. In all other respects, the mode of operation of the synchro is the same as the embodiment described hereinbefore. As in the prior embodiment, it would be desirable to enclose the synchro within a protective housing which is not shown so that a clearer view of the components may be obtained.

The stator of the above described embodiments may be simplified by a printed circuit as illustrated in Fig. 8. A dielectric cylinder 43 has a coat of conducting material 42 such as silver painted on its outer surface. The inner surfaces of each stator pole 17, 18 and 19 consists of thin strips of conducting material such as silver painted grid fashion 61, 62 and 63 along the inside surface of cylinder 43. Three mutually spaced apart silver painted grids 61, 62 and 63 serve as the inner surface of poles 17, 18 and 19. The portions of coating 42 radially juxtaposed the grids 61, 62 and 63 serve as the outer surfaces of the poles 17, 18 and 19. Conducting coat 42 by reason of being continuous and conducting also serves as the common outer connection to complete the Y connected stator pole circuit. For this embodiment grids 61, 62 and 63 will be connected to respective leads 21, 22 and 23 to complete the Y connection for the stator pole circuit. For the circuit of Fig. 6, coating 42 also serves as shell 52. As suggested hereinbefore, the stator structure should be enclosed by a protective housing not shown.

The principles of my invention also apply to the control transformer. This device is used to indicate positional error. It is constructed similar to the synchro transmitter of Figs. 1, 2, and 6, 7 except when in operation it replaces the repeater in the synchro circuit and its rotor is not energized by source 20, i. e., the source energizing the rotor of the transmitter. To use synchro 34 as a control transformer, Fig. 5, switch 35 is thrown open. The fringing field established in synchro 34 corresponds to a positional setting of rotor 11 of transmitter 10. A voltage is established across brushes 42, 43 which corresponds to the relative positional setting of rotor 41 with respect to rotor 11. When the fringing field is tangential to the conducting surfaces of rotor 41, the output across brushes 42, 43 is zero. When field is perpendicular to the surfaces, a maximum voltage appears across brushes 42, 43. Intermediate positions between these limits are a function of the sine of the angle from positional zero of the rotor 41 which may be chosen to correspond to zero output across brushes 42, 43.

It is intended that all matter in this specification and shown in the drawings shall be interpreted as illustrative and not in a limiting sense.

What is claimed is:

1. A synchro device comprising a stator having three poles mutually spaced 120° apart, a shaft adapted to revolve about an axis concentric to said stator, a rotor mounted on said shaft, said stator poles and said rotor comprising dielectric material substantially anisotropic, and a pair of slip rings mounted on said shaft, each of said rings being electrically connected to a correlated diametrically opposite relatively conducting portion of said rotor.

2. A synchro device comprising a stator having three poles mutually spaced apart 120°, and a rotor adapted to revolve about an axis concentric to said stator, said stator poles and said rotor comprising dielectric material substantially anisotropic.

3. A dielectric synchro device comprising a stator having mutually spaced poles and a rotor adapted to revolve about an axis concentric to said stator, said stator poles and rotor comprising dielectric material, each of said stator poles being symmetrical with respect to a radial plane containing the axis of rotation of said rotor.

4. A synchro system comprising two dielectric synchro devices, each of said devices having a stator and rotor, said stators having mutually spaced apart poles, said stator poles and rotors of said devices comprising dielectric materials, an electrical source, and electrical conducting means connected to said source and adapted to energize at least one of said devices with an electrical fringing field.

5. A dielectric synchro device comprising a stator having three poles mutually spaced apart, a rotor adapted to revolve about an axis concentric to said stator, and a conducting shell surrounding said stator, said stator poles and said rotor comprising dielectric material, said rotor being shaped geometrically off-center and relatively long and narrow in the plane perpendicular to the axis of revolution.

6. A device as defined in claim 5, further including an electrical source having one terminal thereof connected to said shell, said rotor having an opening extending therein and along its axis of revolution to receive an electrical conductor, said conductor being connected to the other terminal of said source whereby a fringing electrostatic field is established, said field is guided within the boundary of said rotor and extends outwardly from said rotor to couple into a juxtaposed stator pole.

7. A device as defined in claim 6 wherein said source is a direct current source.

8. A stator structure for a dielectric synchro comprising a dielectric body having outer and inner surfaces, a coating of relatively conducting material on said outer surface, and three discrete coatings of relatively conducting material mutually spaced apart on said inner surface.

9. Apparatus as defined in claim 8 wherein each of said discrete coatings being composed of strips of conducting material arranged grid-fashion along said inner surface.

10. Dielectric synchro apparatus comprising a stator, said stator comprising a hollow dielectric body having a coating of relatively conducting material on the outer surface thereof and three discrete mutually spaced apart coatings of relatively conducting material on the inner surface thereof, and a rotor.

11. Apparatus as defined in claim 10, wherein said rotor is adapted to rotate about an axis concentric and within said hollow dielectric body, a pair of conducting leads adapted to be connected to an external source of electrical energy, said rotor comprising dielectric material and having an opening therein adjacent its axis of rotation to receive one of said leads connected to said source, the other of said leads being connected to the conducting coating along said outer surface.

12. A dielectric synchro device comprising a stator having mutually spaced poles, and a rotor adapted to revolve about an axis concentric to said stator, said rotor comprising dielectric material, each of said stator poles including layers of conducting material separated by dielectric material.

13. A synchro system comprising two dielectric synchro devices, each of said devices having a stator and a rotor, said stators having mutually spaced apart poles, said rotors and said stator poles comprising dielectric material and electrical conducting means for connecting corresponding poles of said stators.

14. A system as defined in claim 13 further including an electrical source and electrical conducting means for connecting said source to at least one of said devices whereby said device is energized with a fringing field.

15. A synchro device comprising, a stator having mutually spaced poles and a rotor adapted to revolve about an axis concentric to said stator, said stator poles and said rotor having alternate layers of dielectric and conductive material, wherein said conductive layers are disposed to permit the penetration of only electric field components perpendicular to said layers.

16. A synchro device as in claim 15 wherein said layers of conductive material are grid-shaped in structure.

17. A synchro device as in claim 15 wherein said layers are disposed substantially perpendicular to radii extending from said axis.

18. A synchro device comprising, a stator having mutually spaced poles and a dielectric rotor adapted to revolve about an axis concentric to said stator, said stator poles having alternate layers of dielectric and conductive material, wherein said conductive layers are disposed to permit the penetration of only electric field components perpendicular to said layers.

19. Synchro apparatus comprising, a stator, said stator having a hollow dielectric cylinder having a coating of relatively conductive material on the outer surface thereof and three discrete mutually spaced apart grid-like coatings on the inner surface thereof, and a dielectric rotor adapted to revolve about an axis concentric to said stator, said rotor being shaped geometrically off-center in a plane perpendicular to said axis of revolution.

20. Apparatus as in claim 19 wherein said rotor has an opening extending therein and along its axis of revolution, and an elongated electrical conductor disposed in said opening and coincident with the axis of revolution.

21. Apparatus as in claim 10 wherein said rotor is composed of dielectric material and is geometrically off-center with respect to its axis of revolution.

References Cited in the file of this patent

UNITED STATES PATENTS

| Number | Name | Date |
|---|---|---|
| 324,010 | Clarke | Aug. 11, 1885 |
| 791,310 | Baker | May 10, 1905 |
| 901,666 | Wehrsen | Oct. 20, 1908 |
| 1,663,890 | Stoller | Mar. 27, 1928 |
| 2,232,143 | Schweitzer | Feb. 18, 1941 |
| 2,247,783 | Massolle | July 1, 1941 |

FOREIGN PATENTS

| Number | Country | Date |
|---|---|---|
| 157,262 | Great Britain | July 10, 1922 |
| 157,263 | Great Britain | July 10, 1922 |